United States Patent [19]
Peyser

[11] 3,985,037
[45] Oct. 12, 1976

[54] BEAD CHAIN SPROCKET CONSTRUCTION

[76] Inventor: Leonard F. Peyser, Old Sleepy Hollow Road, Briarcliff Manor, N.Y. 10510

[22] Filed: May 12, 1975

[21] Appl. No.: 576,302

[52] U.S. Cl. .............................. 74/229; 74/243 B; 74/243 DR; 74/447
[51] Int. Cl.² .................. F16H 55/00; F16H 55/12
[58] Field of Search ............ 74/243 B, 243 LB, 229, 74/230.5, 446, 447, 448, 243 R, 216.3; 29/159.2

[56] References Cited
UNITED STATES PATENTS

| | | | |
|---|---|---|---|
| 1,619,793 | 3/1927 | Kerr | 74/230.5 |
| 2,408,666 | 10/1946 | Mallard | 74/464 |
| 2,577,046 | 12/1951 | Svirsky | 74/230.5 |
| 2,791,911 | 5/1957 | Wasko | 74/243 B |
| 2,825,231 | 3/1958 | Wasko | 74/243 B |
| 2,923,166 | 2/1960 | Brindley | 74/230.5 |
| 2,963,145 | 12/1960 | Bruestle | 74/230.5 |
| 3,237,470 | 3/1966 | Birk | 74/229 |
| 3,651,708 | 3/1972 | Muller | 74/447 |

FOREIGN PATENTS OR APPLICATIONS 722,726   1/1955   United Kingdom ................ 74/230.5

Primary Examiner—Samuel Scott
Assistant Examiner—Allan R. Burke
Attorney, Agent, or Firm—Kenneth H. Murray

[57] ABSTRACT

A bead chain sprocket is formed from a predetermined length of arcuately pocketed flexible plastic cog-like strip wherein the strip is received and affixed within the smooth peripheral groove of a flanged pulley, thereby to provide a simple, reliable and versatile mode of fabrication of such sprockets.

11 Claims, 10 Drawing Figures

U.S. Patent    Oct. 12, 1976    3,985,037
Fig. 1
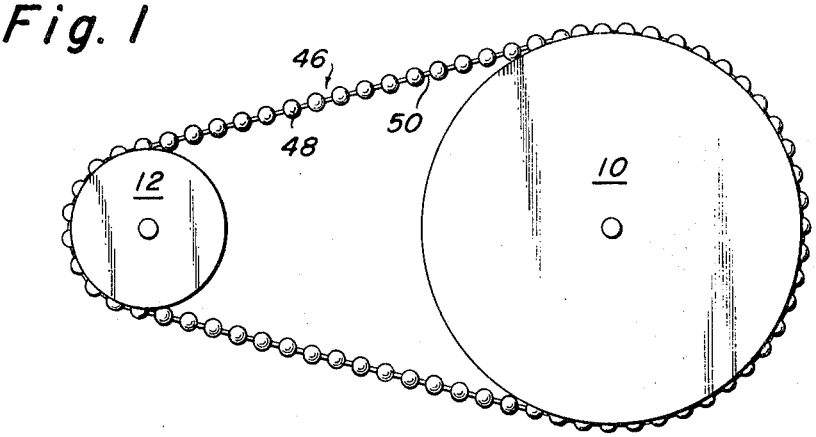
Fig. 2
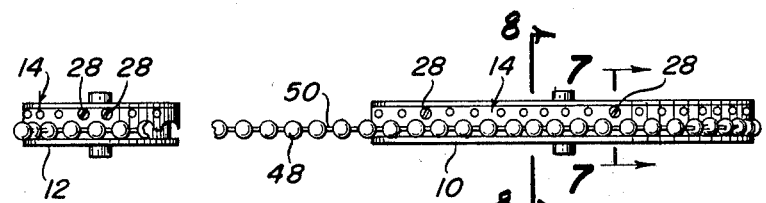
Fig. 4
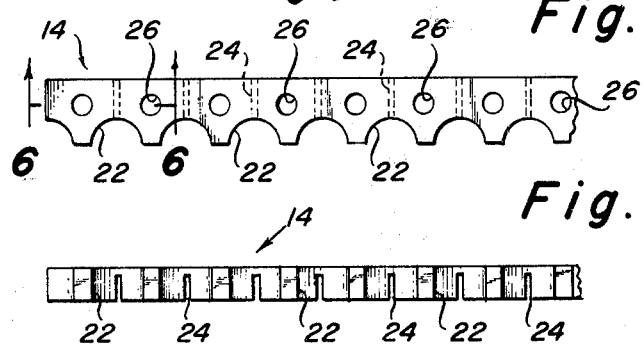
Fig. 5
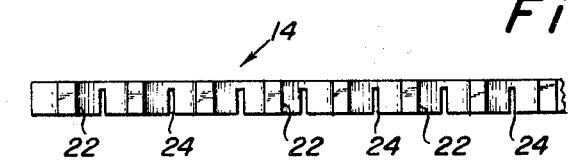
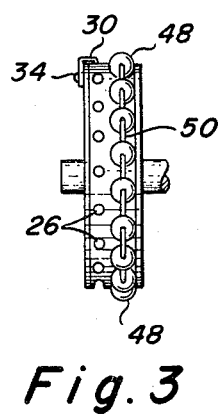
Fig. 3
Fig. 6
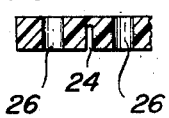
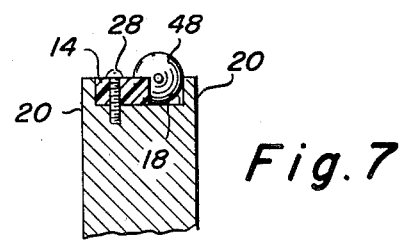
Fig. 7
Fig. 9
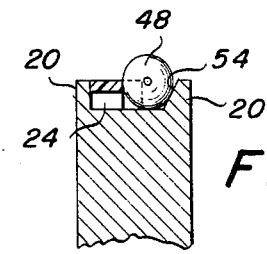
Fig. 8
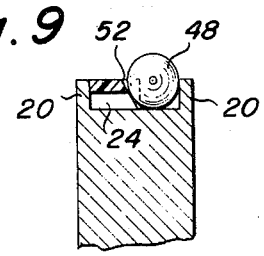
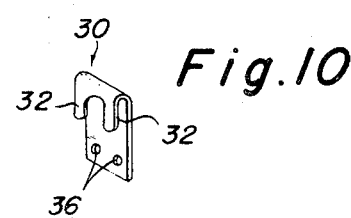
Fig. 10

BEAD CHAIN SPROCKET CONSTRUCTION

BACKGROUND OF INVENTION

Bead chains or bead belt drives are well known in the art as providing inexpensive and exceptionally flexible drives between sprocket wheels used in numerous environments, as radio timers, chart drives, vending machines, light-duty conveyors and the like. The use of a bead chain is often desirable in that it can turn multiple corners in various planes, flex easily about narrow radius pulleys, and be readily assembled or replaced, for example. The bead chains are commonly made of metal or plastic beads depending upon strength, quietness and other characteristics, the beads being interconnected by short pin lengths forming small universal joints, or by endless flexible cords, for example. The same are commercially available from many suppliers, such as Voland Corp. of New Rochelle, N.Y.

Heretofore, however, while the bead belts or chains are readily fabricated, the sprocket pulleys over which the chains are trained have presented a greater manufacturing problem requiring multiple complex stampings, expensive diecast metal sprockets, or precisely molded plastic sprockets of material such as nylon, for example. In each instance, however, the periphery of the sprocket must be carefully controlled during fabrication to provide uniform pitch pockets within which the bead stretches are received in training thereabout.

It is readily evident to illustrate one aspect of manufacturing problems and inventory costs, that a separate precision casting or molding must be made with a carefully configured pocketed periphery for each slight variance in sprocket diameter in any range of sizes, with resultant die and tooling expense.

SUMMARY OF THE INVENTION

The present invention handily obviates these common prior art deficiencies by the provision of an indefinite length of molded and flexible cog-like strip material having arcuate or partial-semicylindric recesses therein, which strip can be cut to any desired length and wrapped around and within a peripheral smooth-walled groove of an inexpensive pulley. Indeed, for mock-up work, for example, a circular pulley blank may be readily peripherally grooved on a lathe and the plastic cog strip of the invention associated therewith. The plastic strip cooperates with the grooved pulley flanges to define sprocket teeth for the bead chain.

The selected length of strip is readily retained in position by screws, clips, adhesives or like securing means.

DESCRIPTION OF THE DRAWINGS

FIG. 1 is a side elevational view of a conventional bead chain trained about an illustrative pair of sprockets associated with any given device;

FIG. 2 is a top plan view of the sprocket and chain arrangement of FIG. 1 and showing one mode of securing the cog strip;

FIG. 3 is an end elevation of a sprocket and chain trained thereabout and illustrating a second mode of securing the cog strip;

FIG. 4 is an enlarged plan view of a length of the cog strip;

FIG. 5 is a side elevation thereof;

FIG. 6 is a fragmentary sectional view taken on the lines 6—6 of FIG. 4;

FIG. 7 is a fragmentary section view through the sprocket taken on the lines 7—7 of FIG. 2;

FIG. 8 is a fragmentary sectional view through the sprocket taken on lines 8—8 of FIG. 2 showing a modified form of pulley;

FIG. 9 is similar to FIG. 8 showing a modified form of cog strip; and

FIG. 10 is a perspective view of the retainer clip seen in FIG. 3.

DESCRIPTION OF THE DISCLOSED EMBODIMENTS OF THE INVENTION

With reference to FIGS. 1 and 2, illustrative larger and smaller rotatably mounted sprockets 10, 12 are shown, each sprocket being defined in part by a strip of cog material 14 thereby to receive illustratively the bead chain 46.

It will be seen that the sprockets 10, 12 comprise essentially merely simple peripherally grooved pulleys readily formed from metal, plastic or wood, the groove being defined by a base 18 and peripheral side flanges 20, 20, as best seen in FIG. 7. Within each groove is received a length of flexible cog strip 14 which may be readily cut from an indefinite strip length to accommodate a particular pulley diameter, as required. It is, of course, desirable that the length or circumference of the groove of the pulley approximate a multiple of the pitch length of the cog strip. Absolute precision is not necessary, as the plastic material of the cog strip will accommodate some yielding or stretching movement without impairing the operation thereof.

Indefinite lengths of the cog strip of the invention may be readily and continually formed by well known conventional plastic molding techniques, as in the Morin patents for example. One suitable plastic material therefor is polyethylene which is capable of withstanding prolonged use without undue or overly rapid wear. Other plastic materials may be similarly used, depending upon the flexure and wear characteristics desired.

The strip 14 in the principal disclosed embodiment thereof is unique and simple in being substantially rectilinear excepting for the arcuate pockets 22 formed therein in an edge margin along one side thereof. The pockets 22 are slightly less than fully semicircular in order to allow clearance for the connecting links or line 50 between adjacent beads 48 of chain 46. Likewise, to avoid any problems of binding or friction lockup, the radius of the pockets 22 is preferably very slightly greater than that of the beads, on the order of up to about 20%, thereby insuring easy seating of the chain beads 48 in the cog pockets.

The face or side of the strip 14 opposite the spaced pockets 22 remains rectilinear thereby to abut smoothly the adjacent pulley flange 20. Importantly, the strip is transversely slotted or notched at 24, preferably on the underside thereof facing the pulley, thereby to impart ready flexibility in wrapping the strip about the pulley arc in assembling the same. While a generally rectilinear slot or kerf 24 is shown, the same may take other forms, such as a V-groove, for example.

The widest or full width portions of the strip disposed between each pair of pockets 22 are apertured at 26 for economy of material as well as to provide a ready mode of detachably securing the strip to the pulley.

Thus, it will be seen that the groove for the pulley may be tapped to receive securing members such as screws or bolts 28 at the adjacent opposite ends of the strip as seen on pulley 12, while larger pulleys as at 10, additional bolts 28 may be spaced along the strip as required. Similarly, a simple U-shaped clip 30 (FIGS. 3 and 10) may include a pair of legs 32 inserted within holes 26 of the strip ends in lieu of adjacent screws 28, the external flange of the U-clip being affixed to the accessible exterior of the pulley as by a bolt or screw 34 through apertures 36.

It will be seen that the arcuate pockets 22 of the cog strip cooperate with the spaced adjacent pulley flange to confine the bead chain 46 therebetween to provide the requisite drive or driven action of the pulley.

In a modification of the strip seen in FIG. 9, the cog strip 50 instead of having right-circular or semi-cylindric pockets 22 as in the strip 14 of FIG. 1, has instead inclined-wall pockets 52 which provide the advantage of insuring the snug accommodation or seating of the beads 48 by virtue of the relatively converging taper between the strip and pulley flange.

Further, and somewhat similarly, the basic cog strip 14 of FIG. 4 may be employed but the cooperating pulley flange 29 includes an inclined shoulder 54 functioning in like manner.

The simplicity of the cog strip of the invention with respect to pulley manufacture is further evident by the fact that pulleys can be readily fabricated from a central disc to the faces of which thin, larger diameter discs are affixed, thereby providing a cheap, ready-made mock-up pulley with which cog strip 14 cooperates to form an excellent bead chain sprocket.

What I claim is:

1. A bead chain sprocket comprising a peripherally grooved pulley having spaced side flanges,
   a strip of flexible plastic material substantially equal in length to the circumference of the pulley groove and disposed therein between said side flanges,
   said strip having one side edge abutting one said pulley flange,
   said strip further having bead-engaging pockets confronting and in spaced relation to the other said pulley flange for cooperation therewith in engaging a bead chain.

2. The sprocket of claim 1 wherein said pockets are substantially semi-cylindrical.

3. The sprocket of claim 1 wherein said pockets are arcuate and taper outwardly toward an increasing width of the strip adjacent the bottom of the pulley groove.

4. The sprocket of claim 2 wherein said other pulley flange is tapered inwardly a greater thickness at the bottom of said pulley groove.

5. The sprocket of claim 1 wherein the said means for securing the strip to the pulley comprises a bolt extending through said strip at each end thereof and into the pulley.

6. The sprocket of claim 1 wherein said means for securing the strip to the pulley comprises a clip interengaged with said strip at opposite ends thereof, and means securing said clip having portions thereof respectively to said pulley.

7. The sprocket of claim 1 wherein said means comprises an adhesive bonding said strip to said pulley.

8. A cog strip for cooperative association with a smooth-grooved pulley to form a bead chain sprocket comprising, a length of flexible plastic material of substantial thickness having opposite side margins, said length having notched arcuate pockets formed in one of said side edge margins and extending laterally inwardly therefrom and said arcuate pockets being at predetermined pitch intervals.

9. The strip of claim 8 wherein said strip is provided with transverse grooves through the plastic material on the underside thereof to facilitate flexure of the strip in bending the same around a pulley during assembly.

10. The strip of claim 8 wherein said strip is further provided with apertures adjacent the arcuate pockets to facilitate securing said strip to the pulley.

11. The strip of claim 8 wherein said arcuate pockets are tapered toward an edge of the strip.

* * * * *